Dec. 26, 1939.　　J. A. DICKINSON　　2,184,892
VALVE
Filed Jan. 14, 1938　　4 Sheets-Sheet 1

INVENTOR
John Arthur Dickinson

Dec. 26, 1939.   J. A. DICKINSON   2,184,892
VALVE
Filed Jan. 14, 1938   4 Sheets-Sheet 2

INVENTOR
John Arthur Dickinson

Dec. 26, 1939.  J. A. DICKINSON  2,184,892
VALVE
Filed Jan. 14, 1938   4 Sheets-Sheet 4
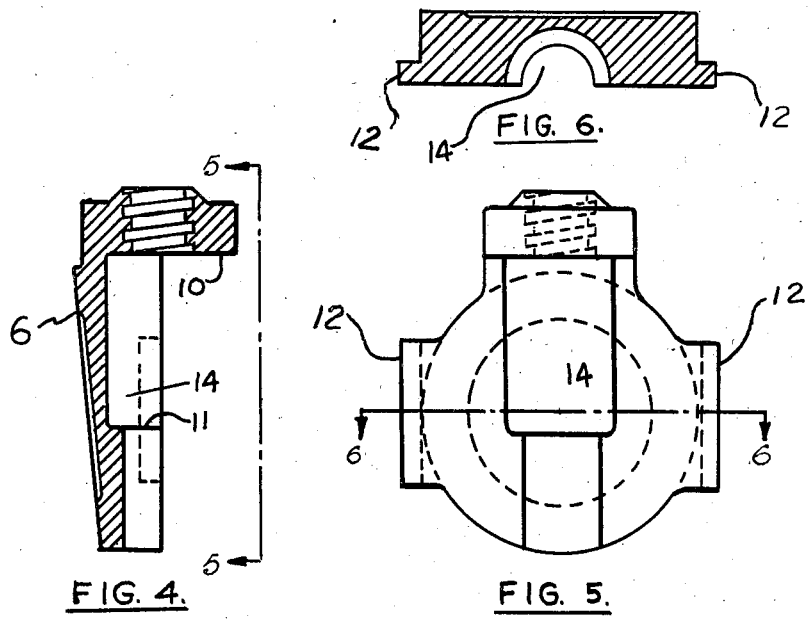
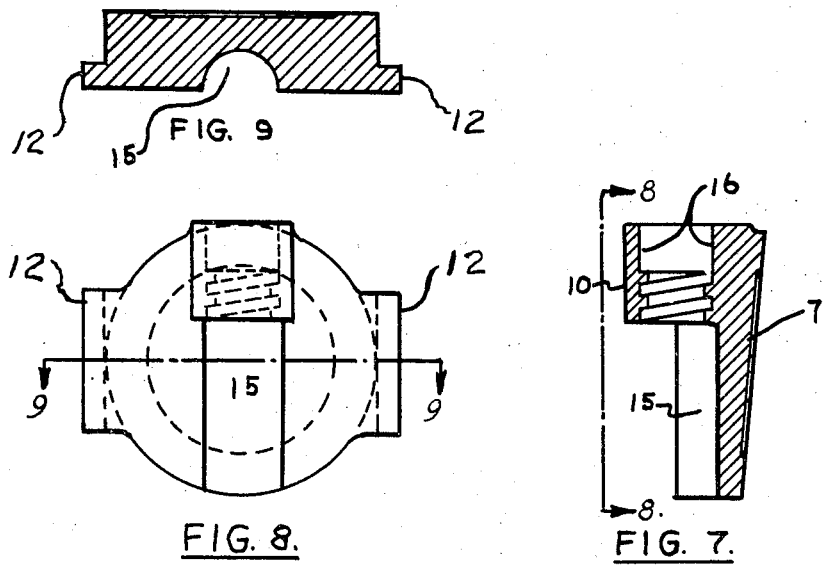
INVENTOR
John Arthur Dickinson Patented Dec. 26, 1939

2,184,892

UNITED STATES PATENT OFFICE 2,184,892

VALVE

John Arthur Dickinson, Montreal, Quebec, Canada

Application January 14, 1938, Serial No. 184,992

6 Claims. (Cl. 251—68)

This invention relates to the type of valves generally known as gate valves, for use on pipe lines to control the flow of any fluid or gas.

It has for its object the partial elimination and reduction of damage to the seating surfaces, caused by fluids flowing through the valve at high velocity, which usually have a detrimental effect on the materials forming the seating surfaces. These materials become scored and cut across their face, allowing the valve to leak.

The only remedy for this trouble at the present time is to provide seating materials of special metals capable more or less of better withstanding this cutting action, or re-facing the seating surfaces to a smooth contact.

This cutting action of high velocity fluids and gases—commonly referred to as "wire-drawing"—cannot be eliminated and is most severe when the valve is used to regulate or throttle the flow, by setting the gate in a partially open position.

Good piping practise today does not recommend the use of gate valves for throttling purposes, but only for shut-off purposes, mainly for the reason stated above. However, a great many users of gate valves pay no attention to these recommendations and will continue to use a gate valve for regulating purposes, with the result that in a short time the valve invariably leaks, and its usefulness as a tight shut-off valve is lost.

In my invention, instead of attempting to resist this natural cutting action by providing seating surfaces of hard abrasive resisting materials, I propose to concentrate the cutting effect on one face of the disc or seat, and preserve the other face of the disc and its seat for the purpose of tight closure only. The former face can then be allowed to cut and score according to the severity of the flow conditions, but it can always be used to regulate and control the flow. No attempt is made on this face to secure tight seating.

On the latter face however, my design is such that the disc is lifted off and returned to its seat under practically "no-flow" conditions, as will be described in detail later. Under these conditions therefore—as the cutting action is directly proportional to the velocity of flow—if there is no flow, there cannot be any cutting action, and the seating surfaces are preserved in good condition for tight seating.

The effective life and usefulness of the valve is thereby increased, and it may be used for throttling and regulating purposes without detriment to its ability to close tight when required to do so.

The accompanying drawings referred to herein and forming part of this specification, show a typical design of a valve in accordance with my invention.

Figure 4 shows a cross-section of one of the discs 7 shown in Figures 1, 2 and 3.

Figure 5 shows an elevation on the line A—A of Fig. 4.

Figure 6 shows a cross-section on line B—B of Fig. 5.

Figure 7 shows a cross-section of the other disc 6 shown in Figures 1, 2 and 3.

Figure 8 shows an elevation on line A—A of Fig. 7.

Figure 9 shows a cross-section on line B—B of Fig. 8.

In all drawings, like numerals of reference indicate corresponding parts in the different views.

Figure 1:
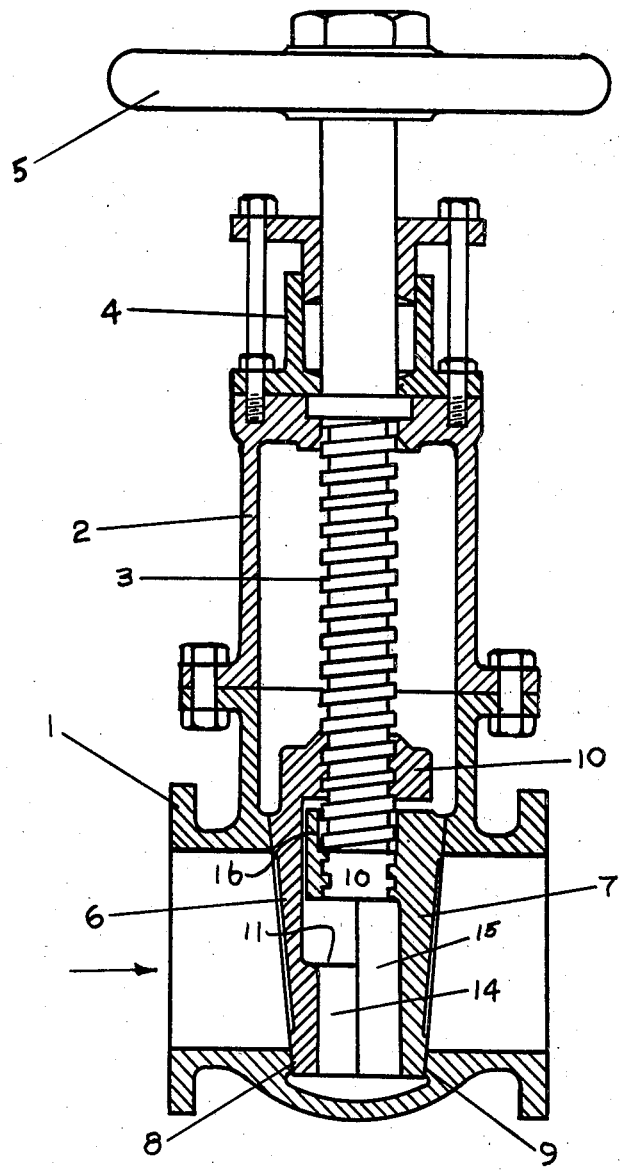
Figure 1 shows a typical cross-section with the discs in the closed position.
Figure 2:
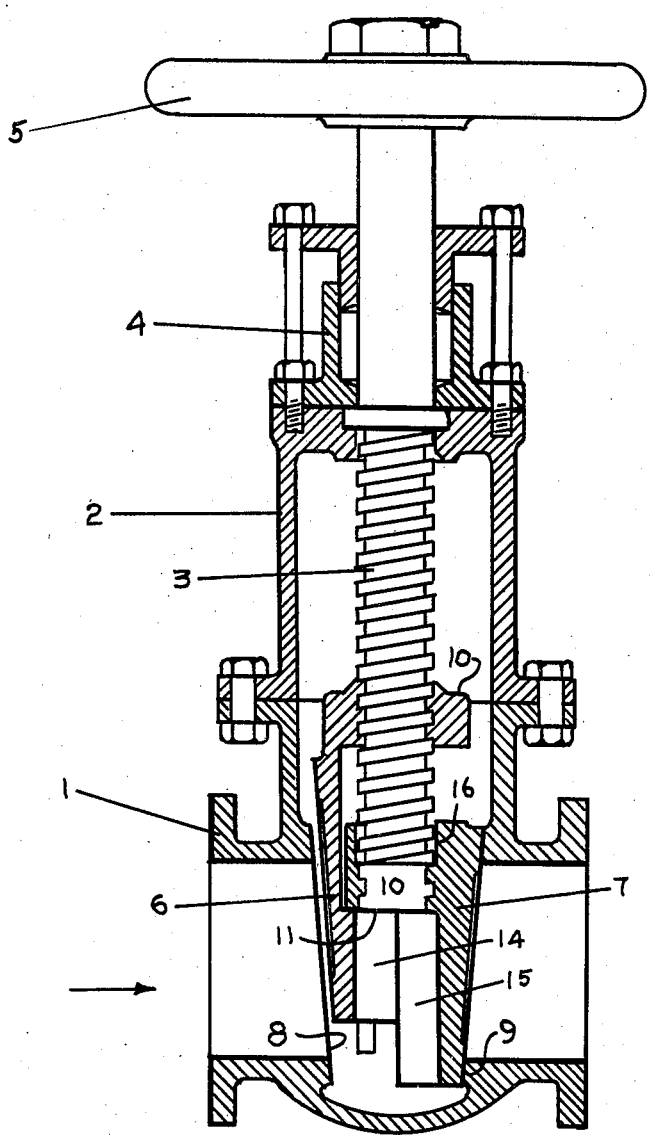
Figure 2 shows a cross-section of the same valve as in Fig. 1, with one disc closed and the other disc partially open.
Figure 3:
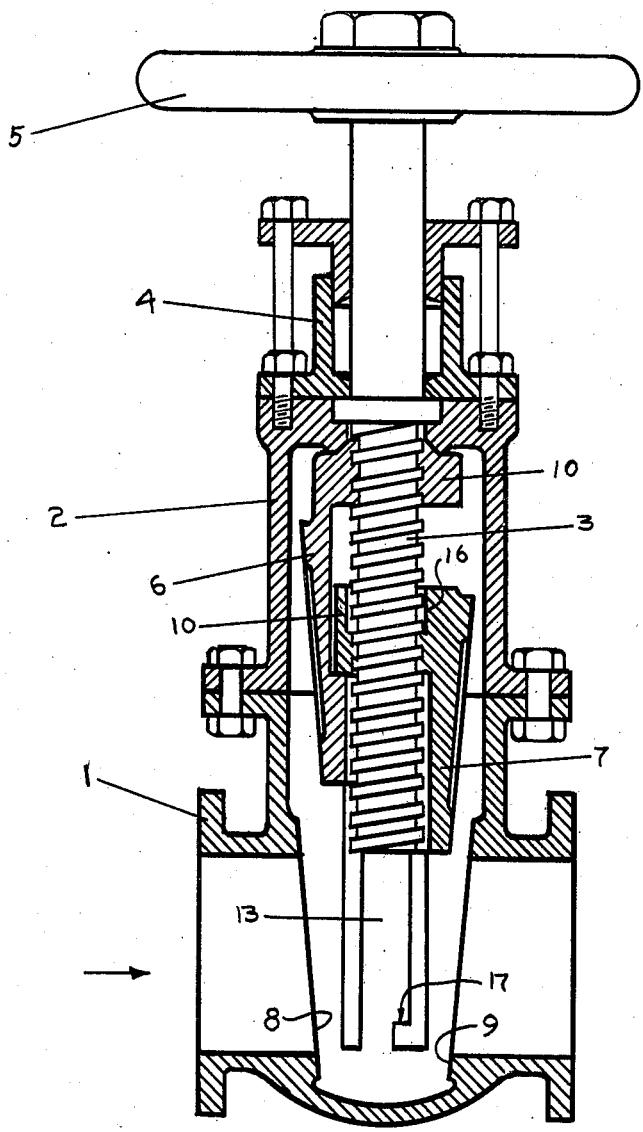
Figure 3 shows a cross-section of the same valve as in Figures 1 and 2, with both discs in the full open position.

Referring now to Figures 1 to 3 inclusive it will be seen that the valve body 1, bonnet 2, stem 3, gland 4 and handwheel 5 are all of standard design, and are not part of the present invention. They are typical only and are shown for the purpose of illustration only, to indicate a standard type of non-rising stem valve such as in common use today.

My invention relates to the design of the discs only, of which I use two, making it what is commonly known in the trade as a double disc gate valve.

The direction of flow is indicated by the arrow, mainly for the purpose of designating the discs, and although the direction shown is preferred, it can be used equally as well with the flow in the opposite direction.

The disc 6 nearest the arrow is hereinafter referred to as the upstream disc, and the other disc 7 is referred to as the downstream disc. When both discs are in contact with each other as in the closed position indicated in Figure 1, they engage corresponding seating surfaces 8 and 9 formed in the body of the valve 1, and together form a wedge, which is forced into tight fitting contact with the seating surfaces by the action of the screw threads on stem 3 when either manual or mechanical power is applied to the handwheel 5.

The upstream disc 6 is of the typical design shown, comprising essentially a tapered seating surface to correspond with the taper of the surface 8 in body 1; a threaded nut or lug 10 engaging the stem 3 by means of which the disc is raised from its seat; a ledge or stop 11 provided on the downstream face of this disc, and designed to engage a corresponding projection on the upstream face of the downstream disc 7; a pair of guides 12 on opposite sides of disc arranged to engage corresponding slots 13 formed in valve body 1 and designed to guide the disc in its vertical travel and keep the seating surfaces from dragging; a recess 14 formed on downstream face to permit passage of stem 3 and projecting portion of disc 7.

The downstream disc 7 is of similar design except that the recess 15 formed on upstream face of disc is designed to permit passage of the stem 3 only, and the threaded portion of nut or lug 10 has the thread removed for a short distance down from the top of the lug as indicated at 16.

The downstream face of disc 6 and the upstream face of disc 7 are in vertical sliding contact with each other, and the downstream side of guide slots 13 formed in the body 1 are provided with a ledge or stop 17 designed to limit the downward travel of the disc 7.

Having designated the essential features of the design, I will describe their operation as follows:—

Referring to Fig. 1, the discs 6 and 7 are in the closed position and are forced tightly against their seating surfaces by the combined wedging action of the two discs. It will be noticed that in this position the stem 3 is in threaded engagement with disc 6 only, but does not engage the threads of disc 7, which is supported in this position by the stops 17 in the guide slots 13 engaging the lower edges of guides 12. Further clockwise rotation of the handwheel 5 rotates the stem 3, forcing the disc 6 closer to its seat and producing the necessary wedging action to insure tight closure.

When the valve is opened by contra-clockwise motion of the handwheel 5 and stem 3, the disc 6 is raised off its seat, but as the stem 3 is still disengaged from disc 7, the latter remains in the closed position. The recess 14 in disc 6 permits a limited upward travel of the latter without interfering with the projecting portion of the lug 10 on disc 7. This limit of travel is determined by the distance between the ledge 11 on disc 6 and the lower face of lug 10 on disc 7.

Continued contra-clockwise rotation of the stem 3 brings the ledge 11 into contact with the lower face of lug 10 on disc 7, as shown in Figure 2, which raises the disc 7 off its seat and brings the threaded portion of lug 10 on disc 7 into engagement with the lower end of stem 3. In this position it will be noted that disc 6 is now well open and off its seat before the disc 7 has started to rise, and therefore before there is any flow through the valve.

Further contra-clockwise rotation of the stem 3, which is now in threaded engagement with both discs, causes the latter to rise simultaneously in the same relative position to each other until the full open position is reached, as indicated in Figure 3.

When the valve is closed by the clockwise rotation of stem 3, both discs travel downward together in their same relative position until they reach the position shown in Figure 2, where the disc 7 runs off the thread and becomes disengaged from the stem 3 and is supported in that position by stops 17. Further clockwise rotation of stem 3 causes disc 6 to continue its downward travel independently from disc 7 until the wedging action closes the valve tight, as indicated in Figure 1. It will be noted that in the downward travel, disc 6 is still well open and away from its seating surface by the time disc 7 reaches the limit of its travel and cuts off the flow of fluid.

From the above description of operation it will be seen that the upstream disc 6 opens before and closes after the downstream disc 7 opens and closes, and as the latter admits and shuts off the flow of fluid, it is evident that the upstream dic 6 opens and closes under practically "no-flow" conditions except for any small leakage past disc 7 due to cutting or wear. The upstream disc 6 is therefore protected from any severe cutting action on account of the fact that no flow occurs until the disc is substantially raised from its seat, and the area of port opening is always proportionately larger than the port opening of disc 7. Due to this difference in port area, the velocity for a given flow will be greater past disc 7 than disc 6, enabling the latter to be less exposed to cutting action and preserving the seating surfaces in better condition for tight seating. Any cutting action on disc 7, whilst effectively preventing tight seating on the downstream face, will not materially affect its use for throttling and regulating the flow.

From the foregoing it will be apparent that the present invention provides valuable improvements in gate valves, whereby the objects set forth have been attained.

Various modifications may be made in this invention without departing from the spirit thereof or the scope of the claims, and therefore the exact forms shown are to be taken as illustrative only and not in a limiting sense, and it is desired that only such limitations shall be placed thereon as are disclosed in the prior art or are set forth in the accompanying claims.

What I claim as my invention is:—

1. In a gate valve of the double disc type, a valve body having wedge shaped seats, a screw threaded stem having a handwheel mounted to rotate in a gland, inflow and outflow discs having faces bevelled to match the seats, each disc having a lug at its upper end threaded to receive the stem, the outflow disc having the upper part of its threading cut away, the inflow disc having a projecting ledge adapted to contact with the lug of the outflow disc to couple the stem to its lug.

2. In a gate valve of the double disc type, a valve body having wedge shaped seats, a screw threaded stem having a handwheel, mounted to rotate in a gland, inflow and outflow disc having faces bevelled to match the seats, each disc having a lug at its upper end threaded to receive the stem, the inflow disc having its lug threaded to the stem above the lug of the outflow disc which is not threaded to the stem when that disc is seated, a projecting ledge from the inflow disc adapted to raise the outflow disc and cause the stem to enter the lug of the outflow disc.

3. In a gate valve of the double disc type, a valve body and a screw threaded stem, wedge shaped seats, wedge faced discs, having lugs with threaded bores, the lug of the inflow disc threaded to the stem above the lug of the outflow disc, a projecting ledge from the inflow disc adapted to raise the outflow disc from its seat and couple its lug with the stem.

4. In a double disc gate valve having inflow and outflow discs operated by a threaded stem, the inflow disc normally threaded to the stem, the outflow disc when seated being free from the stem, a projecting ledge from the inflow disc adapted to raise the outflow disc from its seat and couple its lug with the stem.

5. In a double disc gate valve, a valve body, wedge shaped seats, a screw threaded stem journaled in a gland, wedge faced inflow and outflow discs in vertical guideways in the body, each disc having an internally threaded lug at its upper end, the lug of the inflow disc threaded to the stem, above the lug of the outflow disc, the latter disc when seated being free from the stem, a projecting ledge from the inflow disc adapted to raise the outflow disc and couple its lug with the stem.

6. In a double disc gate valve, a valve body, wedge shaped seats, a screw threaded stem journalled in a gland, wedge faced inflow and outflow discs having side guides sliding in vertical slideways in the valve body, each disc having an internally threaded lug at its upper end, the lug of the inflow disc permanently threaded to the stem above the lug of the outflow disc, the latter disc when seated being free from the stem, a ledge projecting from the middle of the inflow disc adapted as it rises to unseat the outflow disc and couple its lug to the stem.

JOHN ARTHUR DICKINSON.